C. E. SARGENT.
REIN CONTROLLED DEVICE.
APPLICATION FILED SEPT. 28, 1914.

1,162,728.

Patented Nov. 30, 1915.
4 SHEETS—SHEET 1.

WITNESSES:
Frank A. Fahle
Josephine Gasper

INVENTOR
Charles E. Sargent,
BY
Hood & Ashley.
ATTORNEYS

C. E. SARGENT.
REIN CONTROLLED DEVICE.
APPLICATION FILED SEPT. 28, 1914.

1,162,728.

Patented Nov. 30, 1915.
4 SHEETS—SHEET 2.

WITNESSES:
Frank A. Fahle
Josephine Gasper

INVENTOR
Charles E. Sargent,
BY
Hood & Schley.
ATTORNEYS

C. E. SARGENT.
REIN CONTROLLED DEVICE.
APPLICATION FILED SEPT. 28, 1914.

1,162,728.

Patented Nov. 30, 1915.
4 SHEETS—SHEET 4.

WITNESSES:
Frank A. Fahl
Josephine Gasper

INVENTOR
Charles E. Sargent,
BY
Hood Schley
ATTORNEYS

UNITED STATES PATENT OFFICE.

CHARLES E. SARGENT, OF INDIANAPOLIS, INDIANA, ASSIGNOR TO LYONS ATLAS COMPANY, OF INDIANAPOLIS, INDIANA, A CORPORATION OF INDIANA.

REIN-CONTROLLED DEVICE.

1,162,728.

Specification of Letters Patent. Patented Nov. 30, 1915.

Application filed September 28, 1914. Serial No. 863,846.

*To all whom it may concern:*

Be it known that I, CHARLES E. SARGENT, a citizen of the United States, residing at Indianapolis, in the county of Marion and State of Indiana, have invented a new and useful Rein-Controlled Device, of which the following is a specification.

My invention relates to rein-controlled tractors, and to the controlling mechanism therefor. Its object is to provide a system of control whereby the tractor is caused to move forward or rearward, to stop, and to turn to the right or to the left, as desired, and wherein the whole control is obtained by a single pair of reins. In attaining this object, I provide a device which is operated by the two reins and may be moved bodily rearward and swung either to the right or to the left, and which when simply swung to the right or to the left causes the desired steering of the tractor and when moved bodily causes the stopping of the tractor if such bodily movement is free from any lateral movement and forward or backward movement of the tractor if such bodily movement is combined with lateral movement in one or the other direction. Thus if merely the right hand rein is pulled, the tractor turns to the right. If merely the left hand rein is pulled the tractor turns to the left. If both reins are pulled simultaneously and equally, the tractor is caused to stop. If the right rein is pulled first and then both reins are pulled together with the right rein leading, the tractor is caused to move forward. If the left rein is pulled first and then both reins are pulled together with the left rein leading, the tractor is caused to move backward. The apparatus by which this is accomplished is shown in the accompanying drawings, which illustrate my invention.

In these drawings.

The tractor is in the main carried on two traction wheels 10, fixed upon two alined axle ends 11, the periphery of the traction wheels being provided with a series of holes 12 in which teeth 13 may be adjusted radially in and out to grip the ground to any desired extent, these teeth being held in adjusted position by pins 14 which pass through any desired ones of holes 15 with which such teeth are provided. The axle ends 11 are rotatably mounted within bearings 16 formed in a split gear casing 17, which forms part of a frame 18 carrying the various working parts. Mounted on the front end of this frame 18 are two engines 19 having alined crank shafts 20, the adjacent ends of which are bolted to a common driving pinion 21, so that in case either of the engines is disabled it can be disconnected and the other one can continue to drive such pinion 21. These engines may be of any desired type, but are conveniently constantly running internal combustion engines which are maintained in any suitable manner at substantially constant speed. When these engines are internal combustion engines, they are usually water jacketed and associated with a radiator 22, also carried by the frame 18. The pinion 21 meshes with a gear 25 formed on the exterior of a planetary gear casing 26 mounted for rotation about the common axis of the axle ends 11, as by being provided with suitable bearings 27 surrounding such axle ends, and carried by the planetary gear casing 26 are a series of planetary axle shafts 28 on each of which are fixed three planet gears 29, 30, and 31 of successively smaller size in the order named. The planet gears 30 mesh with the outer or driving gear 32 of a differential gearing 33 interconnecting the two axle ends 11, and the planet gears 29 and 31 mesh with gears 34 and 35 coaxial with the axle ends 11 and carried by sleeves 36 and 37 respectively, such sleeves extending through the bearings 16 and 17 annularly between the axle ends and such bearings. The sleeves 36 and 37 at their outer ends carry brake drums 38 and 39 each of which coöperates with brake shoes 40 carried by the bearings 16 or other suitable part of the frame 18 and having a setting knuckle 41 for throwing the brakes into engagement with the inner surface of the brake drum and springs 42 for releasing such brakes. Thus if the brake shoes 40 coöperating with either the brake drum 38 or the brake drum 39 are set, the engine 19 being running, the corresponding gear 34 or 35 is held stationary and by the planetary action of the gears 29 and 30 or 31 and 30, as the case may be, the gear 32, and consequently the axle ends 11 and traction wheels 10 are made to travel either forward or backward, the differential gearing 33 allowing any relative movement between the axle ends as may be necessitated by turning corners. When either gear 34 or 35 is held stationary, the other of such gears turns idly.

The two brake knuckles 41 are connected by tension rods 43 to rearwardly extending arms 44 fixed on alined shafts 45, the adjacent ends of which are provided with similar beveled gears 46 meshing in common with a bevel gear 47 on a rearwardly extending shaft 48 which at its rear end carries a pointer 49. By reason of this connection between the two brakes, but one of them can be set at a time, the setting of one causing the other to be farther removed from setting position, and the pointer 49 indicating by swinging to one side or the other which brake is set. The setting of the brakes is accomplished by two arms 50 and 51 fastened to the two shafts 45 respectively. When either of these arms is pushed backward the other necessarily moves forward because of the gears 46 and 47, and the backward movement of either of these arms causes the corresponding arm 44 to move downward to set the associated brake, such arm 44 passing down beyond the dead center so that the associated tension rod 43 is below the axis of the shaft 45, thus causing the associated brake to be locked in setting position. The brake thus set may be released by pushing backward on that one of the arms 50 and 51 which was thrown forward during the setting of such brake, this causing the arm 44 to be thrown up to bring the tension rod 43 above the axis of the shafts 45 whereupon the springs 42 of the brake which was set release such brake, the two brakes taking a position with the springs 42 thereof in equilibrium and with both brakes unset. The means by which the arms 50 and 51 are moved will be set forth hereinafter.

Figure 1:
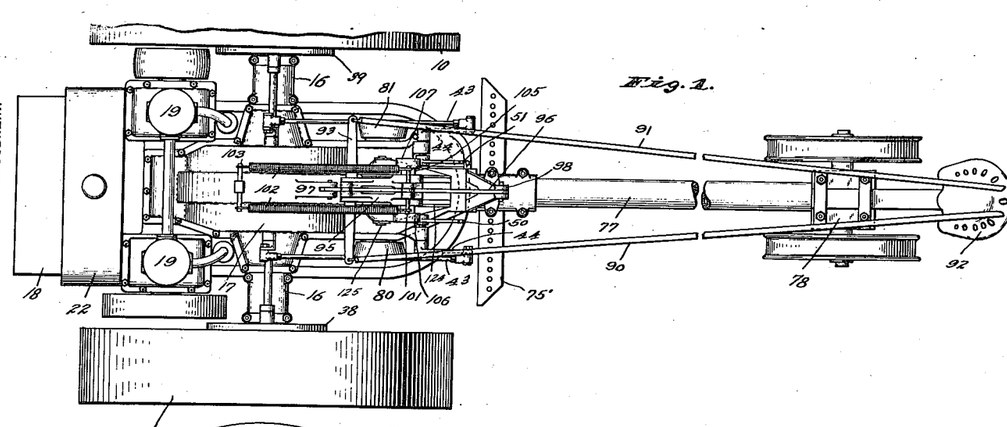
Figure 1 is a plan of a tractor embodying my invention.
Figure 2:
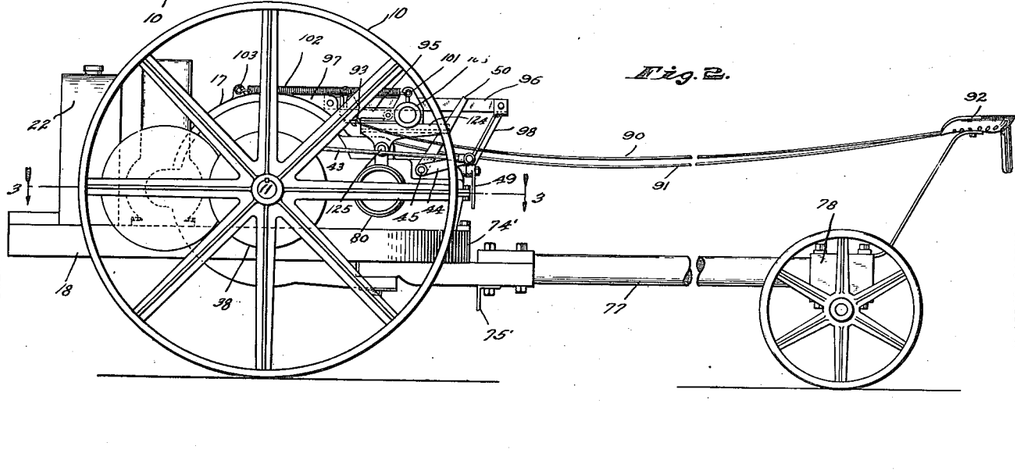
Fig. 2 is a side elevation of such tractor.
Figure 3:
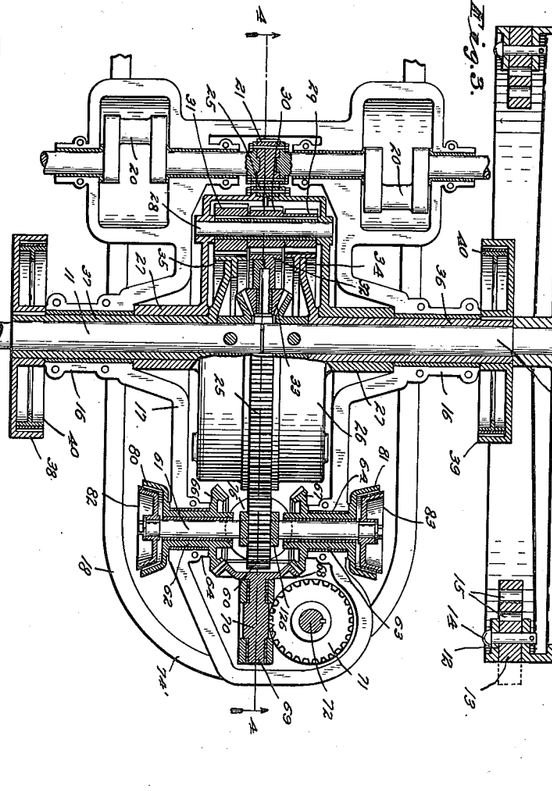
Fig. 3 is a central horizontal section through the gearing between the engine shafts, tractor wheels, and steering mechanism, taken substantially on the line 3—3 of Figs. 2 and 4.
Figure 4:
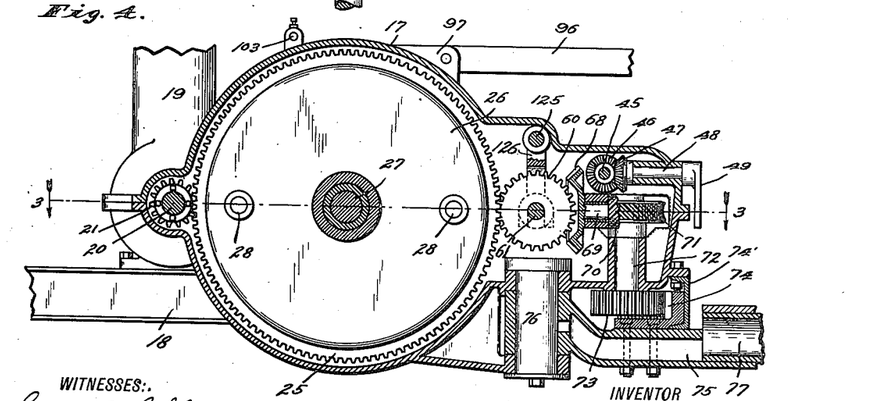
Fig. 4 is a section on the line 4—4 of Fig. 3.
Figures 5, 6, 7:
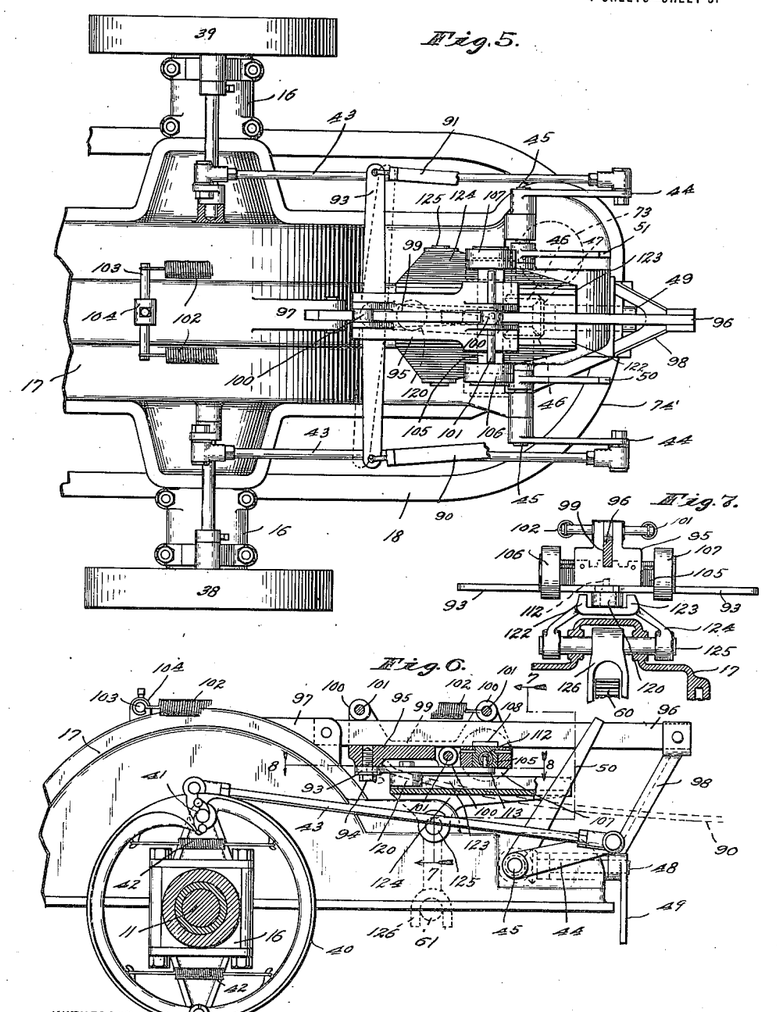
Fig. 5 is a plan view of the control apparatus.
Fig. 6 is a side elevation of the parts shown in Fig. 5, with some of the parts in section.
Fig. 7 is a partial section on the line 7—7 of Fig. 6.
Figure 8:
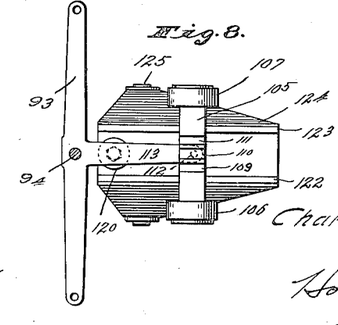
Fig. 8 is a section on the line 8—8 of Fig. 6.
Figures 9, 10:
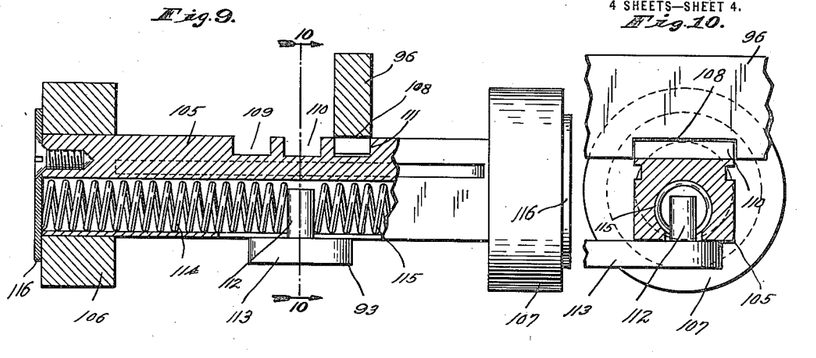
Fig. 9 is an enlarged vertical section through the cross slide and guide rod, with some parts in elevation.
Fig. 10 is a section on the line 10—10 of Fig. 9.
Figure 11:
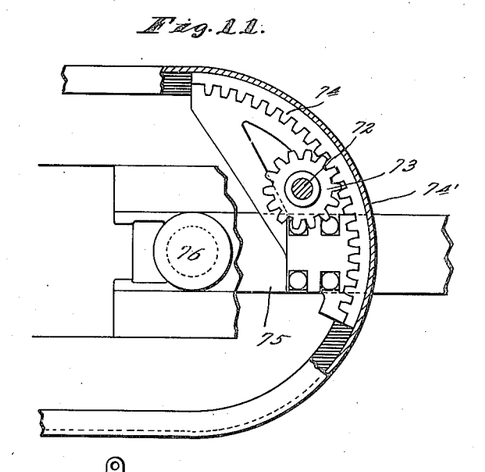
Fig. 11 is an enlarged plan view, with some parts in section, of the mounting of the tongue.

The gear 25 also meshes with a pinion 60 fixed on a shaft 61 slidable longitudinally within two sleeves 62 and 63 mounted in bearings 64 formed in the gear casing 17. Such sleeves at their inner ends are provided with bevel gears 66 and 67 which mesh with a bevel gear 68 on a rearwardly extending shaft 69 carrying a worm 70 meshing with a worm wheel 71 on a vertical shaft 72 on the lower end of which is a pinion 73 which meshes with a gear sector 74 fixed on a rearwardly extending tongue 75 pivotally mounted on the frame 18 by a king pin 76 located at the axis of the gear sector 74 and slidingly supported in a curved channel iron 74' fixed on the frame 18. The tongue 75 may have a suitable extension 77 which at its rearward end may be detachably secured to a truck 78 for use when desired, as when the tongue extension 77 is not secured to some other support, though in many cases the rear end of the tongue extension 77 will be carried by the device being drawn. The tongue 75 may have a crosswise draft bar 75'. The outer ends of the sleeves 62 and 63 carry clutch elements 80 and 81 respectively, which coöperate with clutch elements 82 and 83 fixed on the outer end of the shaft 61. Normally the clutch elements 80 and 81 are both out of engagement with the clutch elements 82 and 83, but by shifting the shaft 61 longitudinally either of these sets of clutch elements may be made to engage, and if at such time the gear 25 is being driven the gear 73 is driven to change the angular relation between the frame 18 and the tongue 75. Thus the forward and rearward movement and the stopping of the tractor is controlled by the clutches 40, and the steering of the tractor is controlled by the clutches 80—82 and 81—83. The control mechanism for these parts is perhaps most clearly apparent from Figs. 5 and 6. There are two reins 90 and 91 which at their rearward ends may be grasped by the driver or operator, who may ride on the device being drawn or on the seat 92 carried by the truck 78. The forward ends of these reins are attached to the left and right hand ends of a cross bar 93 pivotally mounted at its center on a pivot pin 94 which extends upward into a slide 95 mounted to slide forwardly and rearwardly at the top of the tractor frame. This slide 95 is guided in its movements by a fixed longitudinal guide bar 96 supported at its front end on a lug 97 from the top of the gear casing 17 and at its rear end on an upwardly projecting arm 98 from the main frame 18. This guide bar 96 fits into a groove 99 in the upper face of the slide 95, and rollers 100 carried by cross pins 101 in the slide 95 travel on the upper and lower surfaces of the guide bar 96 and carry the weight of the slide. One of the pins 101 is extended on both sides to form attaching points for the rear ends of tension springs 102, the forward ends of which are attached to the two ends of a pin 103 carried by a lug 104 on the gear casing 17. Near its rear end the slide 95 is provided with a cross slide 105, which at its ends is provided with rollers 106 and 107 respectively, these rollers being wider than the arms 50 and 51, with which they coöperate, and in their normal position extending outwardly into the plane of movement of such arms, as is clear from Fig. 5, but having their adjacent faces located closer together than the adjacent faces of the arms 50 and 51. Thus if the cross slide 105 is moved to the right, the roller 106 passes out of the plane of the arm 50 while the roller 107 still remains in the plane of the arm 51, while if the cross slide 105 is shifted to the left the roller 107 passes out of the plane of the arm 51 and the roller 106 still remains in the plane of the arm 50. The cross slide 105 projects upward beyond the lower plane of the guide rod 96, but the under face of such guide rod is provided with a notch 108 with which the cross slide 105 registers when the slide 95 is in its forwardmost position, and the upper face of the cross slide 105 is provided with three notches 109, 110, and 111 into one of which the guide rod 96 must extend when the slide 95 is moved rearwardly. Thus the cross slide 105 may be shifted crosswise of the guide rod 96 only when in its forwardmost position, where it registers with the notch 108. When the guide rod 96 registers with the notch 110, both rollers 106 and 107 are in the planes of their coöperating arms 50 and 51. When the guide rod 96 registers with the notch 109, the roller 106 is out of the plane of the arm 50 while the roller 107 is still in the plane of the arm 51. When the guide rod 96 registers with the notch 111, the roller 107 is out of the plane of the arm 51 while the roller 106 is still in the plane of the arm 50. The shifting of the cross slide 105 is obtained by an upwardly extending pin 112 which projects upward from the rear end of a central rearward extension 113 from the cross bar 93 into a slot extending along the cross slide 105, two compression springs 114 and 115 bearing against opposite sides of such pin 112 and being located between such pin and plates 116 at the two ends of such slot respectively. Thus by pulling first on the left hand rein 90 the cross bar 93 may be turned to cause the pin 112 to shift the cross slide 105 to the right to bring the notch 109 into registry with the guide rod 96, and by then simultaneously pulling on the two reins 90 and 91 the slide 95 and the cross slide 105 are together moved rearwardly. This causes the roller 107 to engage the arm 51, (the roller 106 clearing the arm 50 as already explained,) and the action of the roller 107 on the arm 51 turns the latter downward to cause the setting of the brakes in the brake drum 39, in the manner already explained, and such setting of brakes holds the drum 39 and gear 35 stationary and causes the planetary action of the gears 31 and 30 on the gear 32 to drive the axle ends 11 and traction wheels 10 in a predetermined direction, say rearward, depending upon which way the engine is running. Correspondingly, if the right hand rein is pulled first and then the two reins are pulled together, the cross bar 93 is first turned in the other direction to shift the cross slide 105 to the left to bring the notch 111 into registry with the guide rod 96 and then the slide 95 and cross slide 105 are shifted rearwardly together to cause the roller 106 to act on the arm 50 (the roller 107 clearing the arm 51) to move such arm 50 downward to cause the setting of the brakes in the brake drum 38, thus holding still the gear 34 and by the planetary action of the pinions 29 and 30 and the gear 32 causing the axle ends 11 and traction wheels 10 to be driven in the other direction, say forward. If without first pulling either rein separately the two reins 90 and 91 are pulled together, the slide 95 and cross slide 105 are moved rearward with the notch 110 in registry with the guide rod 96, and this causes the roller 106 or the roller 107 to act on that one of the arms 50 and 51 which is forwardmost, for as already explained, the moving of either of these arms rearward causes the other to move forward, and the pushing rearward of this forwardmost arm, which ever it may be, causes the other arm to move forward and upward to release which ever one of the brake drums 38 or 39 which has been held stationary, thus causing the tractor to stop.

Mounted on the under side of the rearward extension 113 of the cross bar 93, and nearer the pivotal point of such cross bar than is the pin 112, is a roller 120, which is located between two forwardly and rearwardly extending flanges 122 and 123 on a sliding member 124 fixed on a slide pin 125 mounted in suitable holes in the gear casing 17 to slide crosswise thereof, this pin 125 carrying within such gear casing 17 a yoke 126 which embraces the gear 60, so that by the sliding of the pin 125 and yoke 126 crosswise of the gear casing the shaft 61 may be moved lengthwise to cause the setting of either clutch 80—82 or 81—83, or the releasing of both clutches when the yoke 126 is in its middle position. The flanges 122 and 123 are spaced sufficiently far apart so that they are normally clear of the roller 120 and are not engaged by such roller when the cross bar 93 is turned until after such turning has produced the registry of either the notch 109 or the notch 111 with the guide bar 96, though as the turning of the cross bar 93 proceeds beyond such point the spring 114 or 115 is compressed and the roller 120 bears against the flange 122 or 123, depending on whether the left rein or the right rein is being pulled, and causes the sliding member 124, pin 125, and yoke 126 to move to the left or to the right to cause the setting of either the clutch 81—83 or the clutch 80—82, which in turn, as already explained, causes the gear 71 to drive the gear section 74 in one direction or the other to swing the tongue 75 relatively to the frame 18 to steer the tractor. The sliding member 124 and the flanges 122 and 123 extend lengthwise of the tractor frame a considerable distance, so that such flanges may be engaged by the roller 120 to control the clutches 80—82 and 81—83 regardless of what position the slide 95 may be in. Thus by pulling a sufficient distance on either the right rein or the left rein, the tongue 75 is caused to be swung to one side or the other to produce steering of the tractor. This steering may be obtained independently of the control of the driving clutches or brakes 40, and the control of the driving clutches may be obtained independently of the control of the steering mechanism, or both the driving clutches and the steering may be controlled simultaneously, as necessity or convenience may require. The simple pulling of either rein by itself a sufficient distance causes steering. The pulling of either rein by itself and the subsequent pulling of the two reins together causes forward or rearward movement of the tractor. The pulling of the two reins without preliminary pulling of either rein causes stopping of the tractor. If after this simultaneous pulling of the two reins has been started to produce a slight rearward movement of the slide 95 to bring the cross slide 105 out of registry with the notch 108 either rein is pulled more than the other rein by a sufficient amount, the control of the steering may be obtained simultaneously with the control of the forward or rearward movement or stopping of the tractor.

I claim—

1. In combination, a control member having two kinds of movement, a controlled device operated in opposite directions by said control member when the latter is given one of its two kinds of movements in opposite directions respectively, and a pair of controlled devices each having a normal and an abnormal position, and both operated to normal position by said control member when it is given the other of its two kinds of movement and to their respective abnormal positions by said control member when it is given a movement of the second kind combined with a movement of the first kind in opposite directions.

2. In combination, a control member having two kinds of movement, a controlled device operated by said control member when the latter is given one of its two kinds of movements, and a pair of controlled devices each having a normal and an abnormal position and both operated to normal position by said control member when it is given the other of its two kinds of movement and to their respective abnormal positions by said control member when it is given a movement of the second kind combined with a movement of the first kind in opposite directions.

3. In combination, a control member having two kinds of movement, a controlled device operated in opposite directions by said control member when the latter is given one of its two kinds of movements in opposite directions respectively, and a pair of controlled devices each having a normal and an abnormal position, and both operated to normal position by said control member when it is given the other of its two kinds of movement and to their respective abnormal positions by said control member when it is given a movement of the second kind combined with a movement of the first kind in opposite directions, a greater movement of the first kind of said control member being necessary to operate said first controlled device than is necessary for combination with a movement of the second kind for operating either of said pair of controlled devices.

4. In combination, a control member having two kinds of movement, a controlled device operated by said control member when the latter is given one of its two kinds of movements, and a pair of controlled devices each having a normal and an abnormal position and both operated to normal position by said control member when it is given the other of its two kinds of movement and to their respective abnormal positions by said control member when it is given a movement of the second kind combined with a movement of the first kind in opposite directions, a greater movement of the first kind of said control member being necessary to operate said first controlled device than is necessary for combination with a movement of the second kind for operating either of said pair of controlled devices.

5. In combination, a control member mounted for longitudinal and transverse movement, a pair of arms interconnected to move in opposite directions, and operable by said control member when it is moved longitudinally in one direction, said control member having a normal tendency to move in the other direction, and means whereby a movement of said control member in said first direction when in one transverse position displaces one of said arms one way, when in another transverse position displaces the second arm the same way, and when in a third transverse position returns the arms to normal position.

6. In combination, a control member mounted for longitudinal and transverse movement, a pair of arms and operable by said control member when it is moved longitudinally in one direction, said control member having a normal tendency to move in the other direction, and means whereby a movement of said control member in said first direction when in one transverse position displaces one of said arms one way, when in another transverse position displaces the second arm the same way, and when in a third transverse position returns the arms to normal position.

7. In combination, a control member mounted for longitudinal and transverse movement, a pair of arms interconnected to move in opposite directions, and operable by said control member when it is moved longitudinally in one direction, and means whereby a movement of said control member in said direction when in one transverse position displaces one of said arms one way, when in another transverse position displaces the second arm the same way, and when in a third transverse position returns the arms to normal position.

8. In combination, a control member mounted for longitudinal and transverse movement, a pair of arms, and operable by said control member when it is moved longitudinally in one direction, and means whereby a movement of said control member in said direction when in one transverse position displaces one of said arms one way, when in another transverse position displaces the second arm the same way, and when in third transverse position returns the arms to normal position.

9. In combination, a control member mounted for longitudinal and transverse movement, a pair of arms and operable by said control member when it is moved longitudinally in one direction, and means whereby a movement of said control member in said direction when in one transverse position displaces one of said arms one way, when in another transverse position displaces the second arm the same way, and when in a third transverse position returns the arms to normal position, and a controlled device controlled by transverse movements of said control member beyond the outer ones of said three positions.

10. In combination, a control member mounted for longitudinal and transverse movement, a pair of arms and operable by said control member when it is moved longitudinally in one direction, and means whereby a movement of said control member in said direction when in one transverse position displaces one of said arms one way, when in another transverse position displaces the second arm the same way, and when in a third transverse position returns the arms to normal position, and a controlled device controlled by transverse movements of said control member.

11. A tractor, comprising a source of power, a driving wheel, a connection between such source of power and such driving wheel including gearing and a pair of brakes whereby the driving wheel is operated in opposite direction when said two brakes are respectively set, steering means also operated by said source of power, a pair of reins, and means operated by said reins for controlling said two brakes and said steering means.

12. A tractor, comprising a source of power, a driving wheel, a connection between such source of power and such driving wheel including gearing and a pair of brakes whereby the driving wheel is operated in opposite directions when said two brakes are respectively set, a pair of reins, and means operated by said reins for controlling said two brakes.

13. A tractor, comprising a source of power, a driving wheel, a connection between such source of power and such driving wheel including gearing and a pair of brakes whereby the driving wheel is operated in opposite directions when said two brakes are respectively set, steering means, a pair of reins, and means operated by said reins for controlling said two brakes and said steering means.

14. A tractor, comprising a uni-directional source of power, a driving wheel, steering means, a pair of reins, and means operated by said reins for causing said source of power to operate said driving wheel in either direction and to stop operating said driving wheel and for controlling said steering means.

15. A tractor, comprising a uni-directional source of power, a driving wheel, a pair of reins, a reversible and disconnectible driving connection between said uni-directional source of power and said driving wheel, and means operated by said reins and controlling said driving connection to produce operation of said driving wheel in either direction and to stop operation of said driving wheel.

16. In combination, a control member mounted for longitudinal and transverse movement, a pair of arms, and operable by said control member when it is moved longitudinally in one direction, and means whereby a movement of said control member in said direction when in one transverse position displaces one of said arms one way, when in another transverse position displaces the second arm the same way, and when in a third transverse position returns the arms to normal position, and interlocking means for preventing transverse movement of said control member save when it is in a predetermined longitudinal position.

17. In combination, a main control member movable both longitudinally and transversely, an auxiliary control member having a spring mounting on said main control member so as to move therewith but yieldable transversely relatively thereto, a pair of devices interconnected to move in opposite directions, said auxiliary control member when in three different transverse positions being capable of coöperating with one, the other, and either of said devices upon being moved longitudinally, and a third device which is operated by main control device when the latter is moved transversely beyond the points where it moves the auxiliary control device to its two outer positions.

18. In combination, a main control member movable both longitudinally and transversely, an auxiliary control member having a spring mounting on said main control member so as to move therewith but yieldable transversely relatively thereto, a pair of devices, said auxiliary control member when in three different transverse positions being capable of coöperating with one, the other, and either of said devices upon being moved longitudinally, and a third device which is operated by main control device when the latter is moved transversely beyond the points where it moves the auxiliary control device to its two outer positions.

19. In combination, a main control member movable both longitudinally and transversely, an auxiliary control member having a spring mounting on said main control member so as to move therewith but yieldable transversely relatively thereto, a pair of devices interconnected to move in opposite directions, said auxiliary control member when in three different transverse positions being capable of coöperating with one, the other, and either of said devices upon being moved longitudinally.

20. In combination, a main control member movable both longitudinally and transversely, an auxiliary control member having a spring mounting on said main control member so as to move therewith but yieldable transversely relatively thereto, a pair of devices, said auxiliary control member when in three different transverse positions being capable of coöperating with one, other, and either of said devices upon being moved longitudinally.

21. In combination, a main control member movable both longitudinally and transversely, an auxiliary control member having a spring mounting on said main control member so as to move therewith but yieldable transversely relatively thereto, a pair of devices, said auxiliary control member when in three different transverse positions being capable of coöperating with one, the other, and either of said devices upon being moved longitudinally, and a third device which is operated by the transverse movement of said main control device independently of its longitudinal position.

22. In combination, a main control member movable both longitudinally and transversely, an auxiliary control member having a spring mounting on said main control member so as to move therewith but yieldable transversely relatively thereto, a pair of devices, said auxiliary control member when in three different transverse positions being capable of coöperating with one, the other, and either of said devices upon being moved longitudinally, a third device which is operated by the transverse movement of said main control device independently of its longitudinal position, and interlocking means for preventing a transverse movement of said auxiliary control device save when the main control device is in a predetermined longitudinal position.

23. A tractor, comprising a source of power, a driving wheel operable thereby, means for steering the tractor, a pair of reins, and means operable by pulling one rein at a time for controlling said steering means and by pulling both reins at once evenly and oppositely unevenly for controlling the operation of said driving wheel by said source of power to produce forward, backward, and no movement respectively.

24. A tractor, comprising a source of power, a driving wheel operable thereby, means for steering the tractor, a pair of reins, and means operable by pulling one rein at a time for controlling said steering means and by pulling both reins at once for both starting and stopping the operation of said driving wheel by said source of power.

25. In combination, a control device movable in two transverse directions, means operated by said control device when the latter is moved in one of said directions, the nature of such operation depending on the position of said control device in the other of said directions, and means operated by said control device when it is moved in the second of such directions regardless of the position of the control device in the first of such directions.

26. In combination, a control device movable in two transverse directions, means operated by said control device when the latter is moved in one of said directions, and means operated by said control device when it is moved in the second of such directions regardless of the position of the control device in the first of such directions.

27. In combination, a control device movable in two transverse directions, and means operated by said control device when the latter is moved in one of said directions, the nature of such operation depending on the position of said control device in the other of said directions.

28. A tractor, comprising a source of power, a driving wheel, steering means, a pair of reins, and means operated by said reins for causing said source of power to operate said driving wheel in either direction and to stop operating said driving wheel and to operate said steering means.

29. A tractor, comprising a source of power, a driving wheel, steering means, a pair of reins, and means operated by the pulling of said reins for causing said source of power to operate said driving wheel in either direction and to stop operating said driving wheel and for controlling said steering means.

30. A tractor, comprising a source of power, a driving wheel, a pair of reins, and controlling means spring-pressed to a normal position and movable in different ways therefrom to cause said source of power to operate said driving wheel in either direction and to stop operating said driving wheel, said controlling means being connected to said pair of reins so that different pullings of the reins move said controlling means in different ways from said normal position.

31. A tractor, comprising a source of power, a driving wheel, a pair of reins, and controlling means spring-pressed to a normal position and movable in different ways therefrom to cause said source of power to operate said driving wheel and to stop operating said driving wheel, said controlling means being connected to said pair of reins so that different pullings of the reins move said controlling means in different ways from said normal position.

32. In combination, two pairs of clutching devices, two controlling devices, and means interconnecting said controlling devices and said clutching devices for producing both setting and releasing of the clutches of one pair and setting of the clutches of the other pair selectively by different combinations of movements of said controlling devices in one direction and the releasing of the clutching devices of said other pair by maintaining the inequalities of the movements of the controlling devices below a certain value.

33. In combination, two clutching devices, two controlling devices which tend to move in one direction, and means interconnecting the clutching devices and the controlling devices for producing both setting and releasing of said clutching devices by different combinations of movements of said controlling devices in the direction opposite to that in which they normally tend to move.

In witness whereof, I have hereunto set my hand at Indianapolis, Indiana, this 24th day of September, A. D. one thousand nine hundred and fourteen.

CHARLES E. SARGENT.

Witnesses:
 FRANK A. FAHLE,
 ARTHUR M. HOOD.